United States Patent [19]

Leibholz et al.

[11] Patent Number: 4,783,798
[45] Date of Patent: Nov. 8, 1988

[54] ENCRYPTING TRANSPONDER

[75] Inventors: Stephen W. Leibholz, Rydal, Pa.; Samuel D. Epstein, Great Falls, Va.

[73] Assignee: ACS Communications Systems, Inc., Reston, Va.

[21] Appl. No.: 712,015

[22] Filed: Mar. 14, 1985

[51] Int. Cl.⁴ ............................................. H04L 9/04
[52] U.S. Cl. ........................................ 380/23; 380/25
[58] Field of Search .................... 178/22.08, 22.09; 380/21, 23, 24, 25; 235/379–382; 340/825.3, 825.34

[56] References Cited

U.S. PATENT DOCUMENTS

| | | | |
|---|---|---|---|
| 3,984,637 | 10/1976 | Candill et al. | 380/25 |
| 4,193,131 | 3/1980 | Lennon et al. | 178/22.09 |
| 4,386,266 | 5/1983 | Chesarek | 380/25 |
| 4,423,287 | 12/1983 | Zeidler | 178/22.08 |
| 4,471,216 | 9/1984 | Herve | 235/379 |
| 4,578,530 | 3/1986 | Zeidler | 178/22.08 |

Primary Examiner—Salvatore Cangialosi
Attorney, Agent, or Firm—Woodcock Washburn Kurtz Mackiewicz & Norris

[57] ABSTRACT

An encrypting transponder provides data security for transmissions between a terminal and a remote computer, network or terminal. The transponder provides positive user and terminal identification before access to a remote computer file is permitted, and further provides for secure message authentication during the course of data transmission. The transponder is passive and operates in response to interrogation from a remote host computer, thus making it useful with many different operating system and hand-shake protocols.

16 Claims, 2 Drawing Sheets

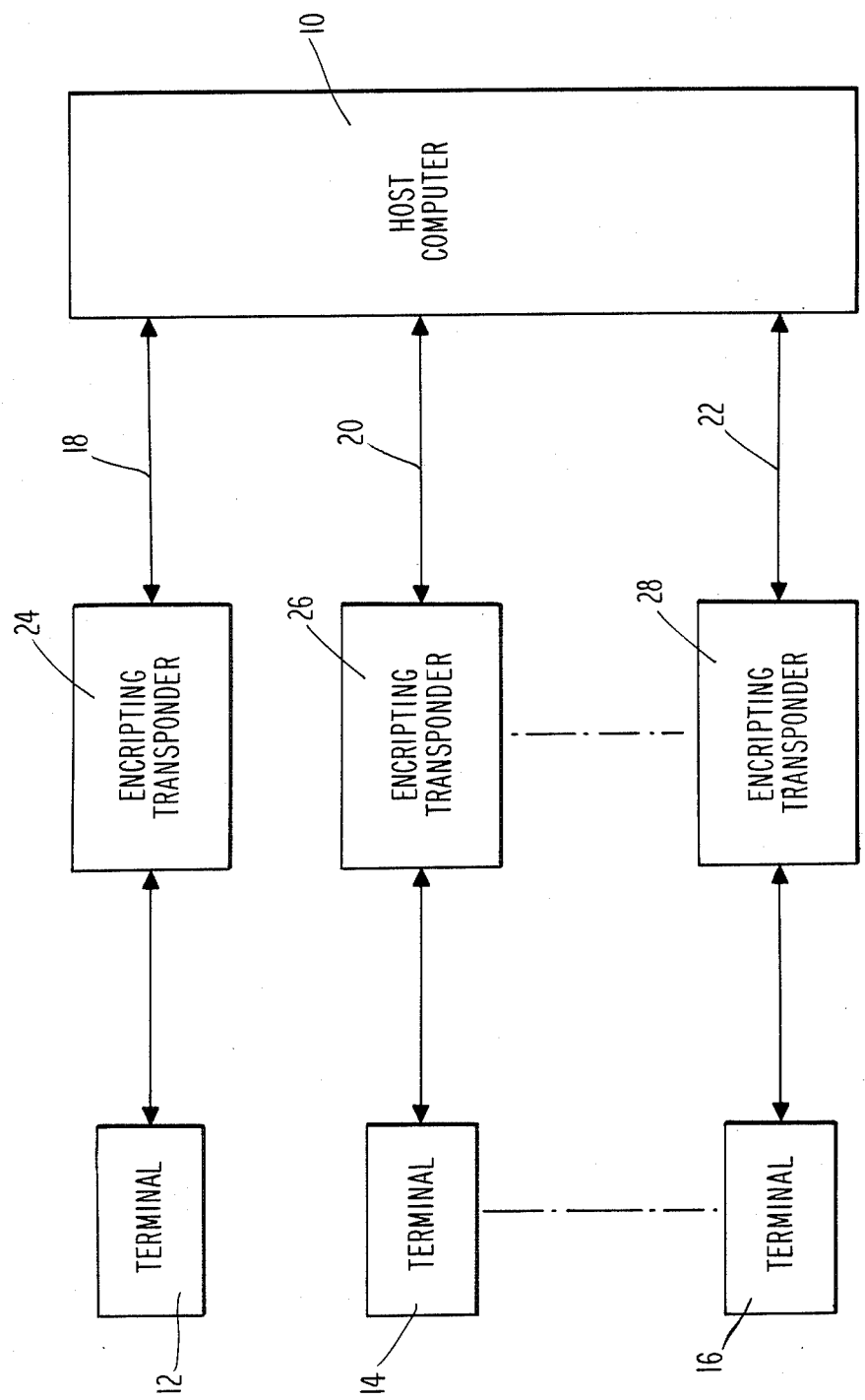

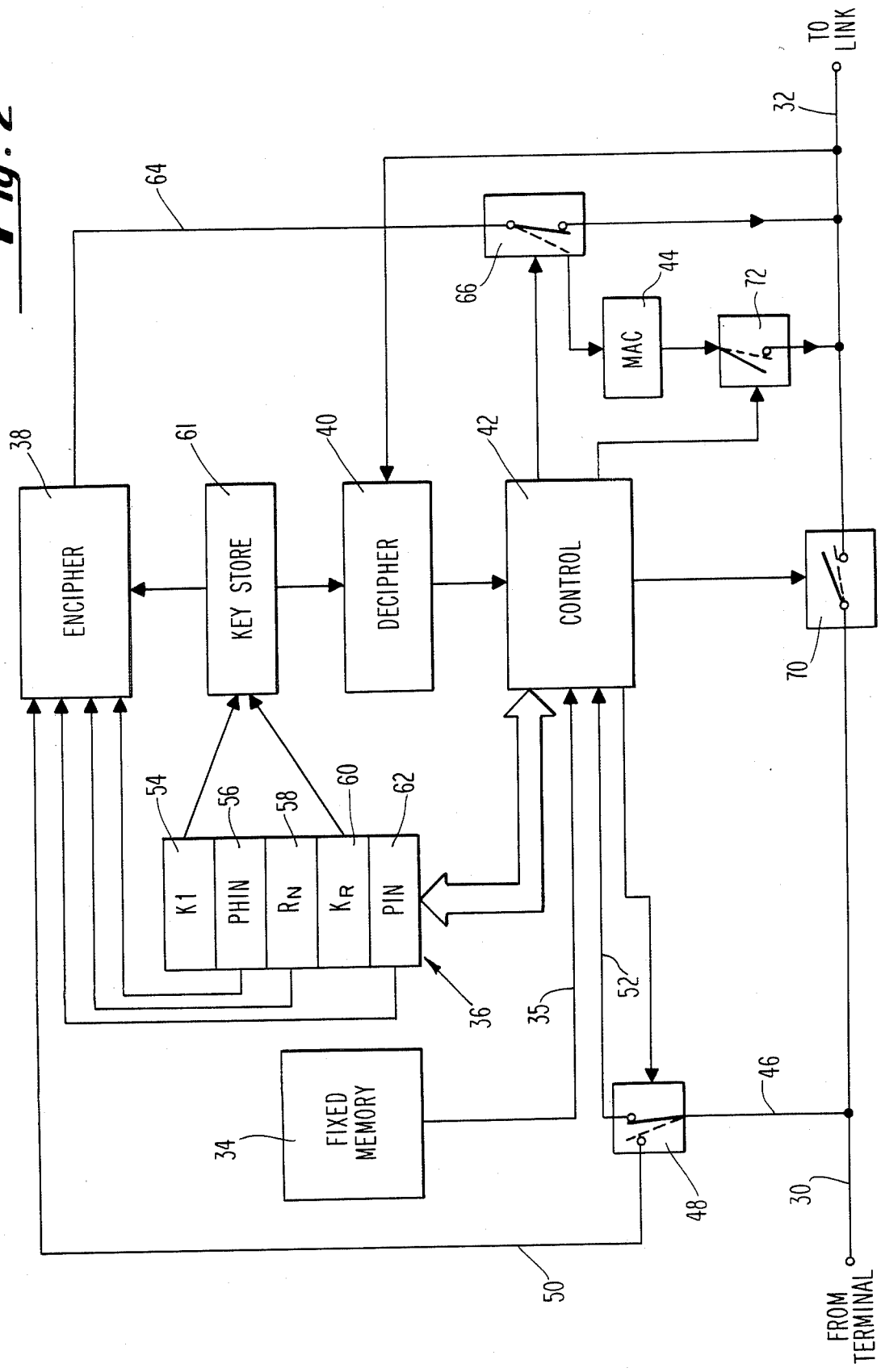

ENCRYPTING TRANSPONDER

FIELD OF THE INVENTION

The present invention relates in general to a data security device and, in particular, relates to a data security device which permits reliable and secure communication between any two digital systems.

BACKGROUND OF THE INVENTION

In the transmission of data between digital systems, security concerns have been frequently raised. Specifically, in data communication between terminal and terminal, between terminal and network, between terminal and host computer and between host computers themselves, there is an important need to positively insure that (1) the user and terminal are both whom they represent themselves to be, and (2) that the communications have not been altered during transmission. While these needs present themselves in many different contexts, they are especially paramount in banking transactions. The present invention provides positive user and terminal identification and data security. Though it is not so limited, the present invention finds particular applicability in the banking industry.

Computerized banking services have become commonplace Specifically, the use of automatic teller machines has proliferated such that banking customers may remotely access a central bank computer from many locations. In the case of automatic teller machines, data security is of paramount importance. It is essential that only authorized persons access the bank's central computer. It is further essential that only authorized persons access each particular account.

To accomplish these results, each customer who is authorized to access the bank's central computer is typically issued a card which permits system access. This card then becomes, in effect, a hardware key to the bank's central computer system. Each customer is also issued a number which uniquely identifies him and his accounts and which permits access to those accounts or files in the computer system. This number, typically referred to as a personal identification number or (PIN) is, in effect, a software key to a particular account. It is only when a customer possesses both a hardware key and a complementary software key that data access is permitted. If a customer's hardware key is lost or stolen, the system security remains intact unless the finder is somehow aware of the corresponding software key.

With automatic teller machines, the bank's central computer typically may be accessed from only a limited number of automated teller machine locations. Automatic teller machines are typically located only at secure locations. Dedicated communications links are provided between the automatic teller machines and the bank's central computer such that data security may be maintained. Because of these features, it is extremely difficult for an unwanted system user to access the bank's central computer by tapping those dedicated lines and mimicking an automatic teller machine.

Despite the ease, convenience and security of automatic teller machines, however, there is a growing trend in the banking industry to provide even more automatic, remote banking services such as bank-at-home services. Accordingly, bank-by-phone services are provided by many banks. These bank-by-phone services are necessarily limited, however, because of data security concerns. For example, customers are not given free access to the bank's central computer system by telephone, nor are all types of banking transactions permitted by phone. Nevertheless, because of the desirability and market acceptance of bank-at-home services, it has been proposed to permit widespread home banking utilizing home computer terminals rather than telephone interface with the host computer.

As is well known, home or personal computers have also proliferated, and it would be particularly desirable to permit home computer users to access centralized bank computers so as to permit home banking from remote computer terminals. Data security problems, not found with automatic teller machines, however, stand in the way. Telecommunications links between home computers and centralized bank computers are not of the dedicated type as in the case of automatic teller machines. Moreover, unlike automatic teller machines, home computers are not necessarily in secure locations. These data security concerns have precluded home computer access to centralized bank computers. In addition, due to the wide variety of home computer operating system software and hardware, the provision of computer security apparatus to protect home computer data transferred across telecommunications links to a central computer must be system specific.

It would be desirable to provide a home computer banking system which does not suffer from the aforementioned disadvantages. Specifically, it would be desirable to provide an economical, electronic bank-at-home computer system which provides improved data security. Further, it would be desirable to provide an electronic bank-at-home system in which the centralized bank computer could positively identify not only the home computer device or terminal with which it is to communicate, but also the user of that terminal as well.

In addition to the problem of positive user and terminal identification mentioned above, still another difficulty which precludes large-scale, at-home banking utilizing personal computers is the need for what might be termed message authentication. It is important that only authorized persons be permitted to access the bank's computer system and particular files in that computer system, and also that all parties to a given transaction be able to rely upon the fact that the transaction is accurately executed in a manner which accomplishes their wishes.

For example, one problem which afflicts some banking transactions across telecommunication links is the problem of "piggy-backing." If, for example, an authorized system user obtains access to a central computer of a banking system, that user may begin and complete a transaction. It is possible, however, that an unauthorized eavesdropper on the telecommunication link between the authorized system user and the bank computer may be monitoring the transaction. After the authorized user has completed his transaction, but before that authorized user has disconnected the telecommunications link between himself and the bank's central computer, it is possible for the eavesdropper to come on-line and mimic the authorized user. Such a result is detrimental for obvious reasons. Accordingly, it would be particularly desirable to provide a data security device which not only ensures that users of a given computer system are authorized users, but which further ensures that messages conveyed by those users across telecommunications links are authentic.

In short, it would be particularly desirable to provide a data security device which permits at-home banking from personal computer terminals and which provides not only positive identification of authorized users, but also message authentication as well.

It would also be desirable to provide a data security device which provides positive user and terminal identification as well as message authentication in a wide variety of contexts including, but in no way limited to bank computer systems.

It would also be desirable to provide a data security device which is not system specific, i.e., which may be used with a wide variety of different computer equipment without modification.

SUMMARY OF THE INVENTION

These and other objectives are achieved with the present invention which comprises an encrypting transponder that ensures that only authorized users are given access to a remote computer system from a given computer terminal. In an optional preferred embodiment, the transponder further provides means for authenticating messages transmitted between that given computer terminal and a remote terminal or computer across an insecure telecommunications link.

The transponder includes an input line from the terminal to the transponder and an output line from the transponder to the telecommunications link. The transponder includes a user identification means having a memory with a first portion for storing a first key which uniquely identifies the particular given terminal from other terminals on the system. Each authorized user of the system is provided with a personal identification number which uniquely identifies that user from other authorized users. A second memory portion prestores a second key comprising an interrogator or host identification number which uniquely identifies the remote host computer from other possible host computers. An enciphering means is selectively responsive to the first key stored in the first memory portion. The enciphering means initially encrypts the personal identification number under the first key. The personal identification number, so encrypted, is thereafter transmitted across the telecommunications link to the remote computer system. At the remote system, the encrypted personal identification number is monitored. If the encrypted personal identification number is an authorized number, the remote computer encrypts its interrogator or host identification number and a first random number under the first key and returns this encrypted information to the given computer terminal across the telecommunications link.

At the transponder, a deciphering means is provided which is selectively responsive to the first key and which decrypts the interrogator or host identification number and the first random number which have been transmitted from the host across the telecommunications link under that first key.

Control means are provided at the transponder for comparing the decrypted interrogator or host identification number with a prestored interrogator identification number stored in memory. If the decrypted interrogator identification number received from the remote system corresponds with the prestored interrogator identification number at the transponder, positive identification of both the remote system and the terminal is complete and the transponder proceeds to generate a working key. At the same time, the remote system generates an identical working key. The working key generated at both transponder and remote system is a function of the personal identification number, the interrogator identification number and the first random number. The working key is thereafter stored in the memory of the transponder and the enciphering and deciphering means of the transponder are thereafter responsive to the working key and not to the first key for the remainder of the communications session.

The transponder also optionally includes a message authentication means which stores a message authentication code. The message authentication code is automatically transmitted to the host upon receipt at the transponder of an interrogation code from the host. In accordance with an important aspect of the present invention, the message authentication code is a preselected subset of data input to the input line of the transponder, the subset being encrypted under the working key. The interrogation code is a predetermined function of the first random number.

The foregoing arrangement permits the centralized host computer of, for example, a banking institution to positively authenticate the content of data communicated to it over undedicated telecommunications links by comparing the message authentication code with the corresponding message authentication code which has been generated at the host. The message authentication codes are periodically verified in this fashion throughout the telecommunications session. So long as verification is accomplished, the transaction between the given terminal and the host continues to completion.

BRIEF DESCRIPTION OF THE DRAWING

Various objects and advantages of the present invention will be more fully understood by reference to the accompanying drawing, in which:

FIG. 1 is a schematic diagram of a telecommunications network employing a plurality of the encrypting transponders of the present invention; and FIG. 2 is a schematic diagram of a single encrypting transponder of the type shown in FIG. 1.

DESCRIPTION OF THE PREFERRED EMBODIMENT

Referring now to FIG. 1, a host computer is shown generally at 10. The host computer 10 is, for example, situated at a banking institution. The host computer 10 may be accessed from a wide variety of locations by many authorized users. Also shown in FIG. 1 are a plurality of computer terminals 12, 14 and 16, which are located remote from the host computer 10 and, in some cases, remote from each other. Each of the computer terminals 12, 14 and 16 are respectively connected to the host computer across telecommunication links 18, 20 and 22. The telecommunication links 18, 20 and 22 typically comprise standard telephone lines and, therefore, terminals 12, 14 and 16 are not connected in a secure fashion to the host computer 10. In order to ensure that only authorized users are given access to the host computer 10 from a given computer terminal 12, 14 or 16, and in accordance with the present invention, each terminal is provided with an encrypting transponder 24, 26 and 28, respectively. These transponders are situated between the terminals 12, 14 and 16 and their associated telecommunication links, 18, 20 and 22 to the host 10. Each encrypting transponder 24, 26 and 28, as will be more fully explained below, preferably includes both a user identification means which ensures that only an authorized user is given access to the host, and a message authentication means which ensures that data transmitted across the links 18, 20 and 22 during the course of a given communications session is authentic, i.e., that it is data actually transmitted from an authorized user.

While in the embodiment of FIG. 1, the encrypting transponders 24, 26 and 28 protect data communications between remote terminals 12, 14 and 16 and a centralized host computer 10, it should be understood that this arrangement is shown only for the purpose of illustration and is but one environment in which the encrypting transponder of the present invention finds utility. The encrypting transponders of the present invention may be utilized to provide data security not only between terminal and host, but also between two terminals, or in cross domain communications between two central or host computers. In any installation in which it is used, however, the encrypting transponder of the present invention operates in a passive or responsive mode whereas the remote computer system to which the transponder is connected operates in an active or interrogation mode.

Referring now to FIG. 2, one embodiment of an encrypting transponder such as 24 will be described in detail. As shown in FIG. 2, each encrypting transponder such as 24 is connected to a terminal such as 12 by means of an input line 30 coupled to the terminal. Each transponder 24 is also provided with an output line 32 coupled from the transponder to the telecommunications link. The input line 30 and the output line 32 are selectively connected by a switching means 70 which is normally open as shown in FIG. 2. Each encrypting transponder such as 24, in accordance with the present invention, includes user identification means comprised of a fixed memory 34 and a dynamic variable memory 36, both of which will be more fully described below. The encrypting transponder 24 also includes an enciphering means 38, a deciphering means 40 and a microprocessor control means 42. Finally, the encrypting transponder 24 includes a message authentication means 44. Although shown as a separate component in FIG. 2, the message authentication means 44 may comprise a portion of the dynamic memory 36.

In accordance with the present invention, data from the input line 30 is directed via a first line 46 to a first switching means 48. The first switching means 48 is under the control of the microprocessor control means 42. The first switching means 48 is operative to connect incoming data from the input line 30 either directly to the enciphering means 38 via line 50 or, alternatively, to the microprocessor control means 42 via line 52. At the initiation of each communications session, input data is directed to the control means 42 through line 52, as shown in FIG. 2.

Each authorized user of the computer system of the present invention is provided with a personal identification number (PIN) which uniquely identifies that user from other users. At the initiation of a communication session, an authorized user keys in his personal identification number (PIN) to his particular computer terminal. That personal identification number (PIN) is directed via input line 30 and lines 46 and 52 to the control means 42. Upon initial receipt of the personal identification number (PIN) at the control means 42, a first key (K1) is generated by the control means 42 and stored in the dynamic memory 36 at location 54.

In accordance with the present invention the fixed memory 34 is coupled to the control means 42 by line 35. The fixed memory 34 preferably comprises a fused link read-only memory. Preferably, the fixed memory 34 contains a prestored data set comprised of 128 eight bit bytes of random data. The first key (K1) generated at the control means 42 is a subset of the data set stored in the fixed memory 34 and is also a function of the personal identification number (PIN) input to the input line 30.

In accordance with the present invention, after the first key (K1) is generated, it is stored in a first memory portion 54 of the dynamic memory 36. Also stored in a second portion 56 of the dynamic memory 36 is a prestored interrogator or host identification number (PHIN) which uniquely identifies the host 10 from other possible hosts to which the various computer terminals of the system could be connected. A first random number (Rn) and a working key (KR) which will be more fully described below are later stored in a third and a fourth portion 58 and 60 of the dynamic memory 36. The user's personal identification number may also be stored in a fifth portion 62 of the dynamic memory 36.

The aforementioned enciphering means 38 is selectively responsive to either the first key (K1) stored in the first portion 54 of the dynamic memory 36 or to the working key (KR) which will be described further below. The selected key (K1) or (KR) is determined by the microprocessor control means 42 and directed from the dynamic memory 36 to a key storage memory 61. Upon generation of the first key (K1), that key is stored in the key storage area 61 and the enciphering means 38 is responsive to the first key (K1). A line 64 is connected between the output of the enciphering means 38 and a second switching means 66. The second switching means 66 operates under the control of the control means 42 to direct encrypted data from the encipher means 38 directly to the output line 32 or, alternately, to the message authentication means 44 as shown.

In order to ensure that only authorized users are given access to the host computer 10, the personal identification number (PIN) which has been input to the particular terminal and stored in the fifth portion 62 of the dynamic random access memory 36 is encrypted at the encipher means 38 under the first key (K1) stored in key storage area 61. The second switching means 66 connects the encrypted personal identification number (PIN) from the enciphering means 38 directly to the output line 32 for transmission across the telecommunications link to the host.

At the remote host computer, upon receipt of the personal identification number (PIN) encrypted under the first key (K1), the host computer compares that number to a prestored table. If the number matches a prestored value stored at the host computer, the host computer determines that an authorized user of the computer system is located at an appropriate computer terminal. The host computer then encrypts its own interrogator or host identification number (HIN) and also generates a first random number (Rn) both of which are encrypted under the first key (K1). The host transmits the encrypted interrogator or host identification number and encrypted random number to the transponder 24.

At the deciphering means 40 of the transponder 24, the interrogator or host identification number (HIN) and random number (Rn) which have been transmitted from the host are decrypted under the first key (K1) which is stored in the key storage area 61. The control means 42 compares the decrypted interrogator or host identification number (HIN) with the prestored interrogator identification number (PHIN) stored in the second portion 56 of the dynamic memory 36. If the decrypted interrogator identification number (HIN) and the prestored interrogator identification number (PHIN) match, the encrypting transponder 24 has confirmed that it is connected to the appropriate host computer and proceeds with the transaction. If, alternatively, the decrypted interrogator identification number (HIN) and the prestored interrogator identification number (PHIN) found in the second portion 56 of the dynamic memory 36 do not match, the transponder 24 aborts the transaction automatically.

If the transaction is to continue, the control means 42 generates a working key (KR) which is to be utilized for the remainder of the communication session. In accordance with the present invention, the working key (KR) is a predetermined function of the personal identification number (PIN), the host identification number (HIN) and the first random number (Rn). After computing the working key (KR) in accordance with this predetermined function, the working key is stored in a fourth memory portion 60 of the dynamic memory 36 and is also transferred under the direction of the control means 42 to the key storage area 61 where it replaces the first key (K1) which had previously been stored there. Thereafter, the enciphering means 38 and the deciphering means 40 are both responsive to the working key (KR) and not to the first key (K1).

Since the working key (KR) is a function of the personal identification number (PIN), of the interrogator or host identification number (HIN) and of the first random number (Rn) and since all of these values are resident in the host, the host also independently generates the working key (KR). Both the transponder 24 and the host 10 verify that their respective working keys (KR) match. To accomplish this result at the transponder 24, the host identification number (HIN) found in the second portion 56 of the dynamic memory 36 and the random number (Rn) stored in the third memory portion 58 are encrypted under the working key (KR) by the encipher means 38 and transmitted to the host along the telecommunications link.

At the host computer 10, the interrogator or host identification number (HIN) and random number (Rn) are decrypted under the working key (KR) stored at the host, the host computer previously having computed the working key (KR). After the decryption of the interrogator or host identification number (HIN) and random number (Rn) under the working key (KR) has been completed, the host compares these values to stored values. If a match is made, the host has verified that its working key (KR) corresponds to the working key (KR) of the transponder.

In order for the transponder to also verify that it is employing a common working key (KR) the host optionally encrypts its interrogator or host identification number (HIN) and the first random number (Rn) under the working key (KR) and transmits the same to the transponder 24. The transponder decrypts these values and compares them with stored values. If a match is made, working key verification is complete.

Once the working key (KR) has been verified, the control means 42 causes the first switching means 48 to change state, thereby directing incoming data from the input line 30 and line 46 directly to the enciphering means 38 across line 50. Also, simultaneously, the control means 42 causes the second switching means 66 to change state directing the data which has been encrypted under the working key (KR) at encipher means 38 to the message authentication means 44 where the same is stored. Lastly, and simultaneously with the change in state of switching means 48 and 66, a third switching means 70 is caused to change state from its initial position such that incoming data to the transponder 30 is transmitted directly from the input line 30 to the output line 32 and directly to the host computer in an unencrypted form.

In accordance with an important aspect of the present invention, the message authentication means 44 stores the aforementioned message authentication code (MAC) until the transponder 24 is interrogated by the host. The message authentication code (MAC) consists of input data from input line 30 which has been encrypted under the working key (KR) at the encipher means 38. From time to time, and at the discretion of the host 10, the host may transmit an interrogation code (IC) to the encrypting transponder 24. Upon receipt of that interrogation code (IC), the control means 42 of the transponder automatically transmits the message authentication code (MAC) stored in the message authentication means 44 by closing a fourth switching means 72. The fourth switching means 72 operates under the control of the control means 42 to dump the contents of the message authentication means 44 directly to the output line 32.

In accordance with the preferred embodiment of the present invention, the interrogation code (IC) referred to above is a variable which is a predetermined function of the first random number (Rn) encrypted under the working key (KR). In the particularly preferred embodiment of the present invention, the interrogation code (IC) is a pseudorandom function of the first random number. The interrogation code (IC) may be a variable which changes throughout the transaction. Upon receipt of a given interrogation code (IC) at the transponder 24, the interrogation code (IC) is compared with the previous value stored in the third memory portion 58 of the dynamic memory 36. If a match is obtained, the transponder 24 automatically transmits the message authentication code stored in the message authentication means 44 across the telecommunications link 18 to the host 10.

At the host computer 10, the message authentication code transmitted from the transponder is compared with the message authentication code which has been independently computed at the host. If the message authentication codes transmitted from the transponder 20 and computed at the host 10 match the transaction proceeds.

In order to better understand the user identification procedure and message authentication procedures referred to above, the various information exchanges between the transponder 24 and the interrogator or host 10 may be summarized as follows:

| TRANSPONDER | HOST |
|---|---|
| 1. Encrypt PIN under K1<br>E K1 (PIN)→ | |
| | 2. Encrypt HIN and Rn under K1<br>←E K1 (HIN, Rn) |
| 3. Generate (KR)<br>KR = f (PIN, HIN, Rn) | 3. Generate (KR)<br>KR = f (PIN, HIN, Rn) |
| 4. Encrypt HIN and Rn under KR<br>E KR (HIN, Rn)→ | |
| | 5. Encrypt HIN and Rn under KR<br>←E KR (HIN, Rn) |
| 6. Generate (IC)<br>IC = f (Rn) | 6. Generate (IC)<br>IC = f (Rn) |
| | 7. Encrypt IC under KR<br>←E KR (IC) |
| 8. Transmit MAC<br>MAC→ | |

It will be seen from the foregoing arrangement that the transponder of the present invention simply responds to commands from the host computer or interrogator device. For this reason, there is no need to provide explicit delimiters from the terminal message stream in order to define message boundaries. Moreover, the transmission of the message authentication code (MAC) may be made without the use of arbitrary protocols. Because of this flexibility, the host computer or interrogator may request message authentication as frequently or infrequently as may be necessary or appropriate based upon such considerations as value of the data being transmitted, past history of the user, noise conditions on the circuit, etc. Moreover, the frequency with which message authentication is requested may be altered without any cooperative effort on the part of the user.

While a particular embodiment of the present invention has been shown and described, it will be appreciated by those skilled in the art that other embodiments falling within the spirit and scope of the appended claims may be employed.

What is claimed is:

1. A passive encrypting transponder for ensuring that only authorized users are given access for transmissions with a remote digital system, including a host computer, from a given computer terminal connected to said system across a telecommunications link, said transponder comprising:
   (a) an input line, including first switching means, for coupling said given terminal to said transponder;
   (b) an output line, including second switching means, for coupling said transponder to said link;
   (c) third switching means for selectively coupling said input line to said output line;
   (d) a user identification means including:
      (i) a first memory portion for storing a first key which uniquely identifies said given terminal from other terminals connectable to said system, each of said authorized users being provided with a personal identification number which uniquely identifies that user from other authorized users;
      (ii) a second memory portion for prestoring an interrogator identification number which uniquely identifies said system from other possible systems;
      (iii) a third memory portion; and
      (iv) a fourth memory portion;
   (e) an enciphering means, selectively responsive to said first key stored in said first memory portion, for encrypting, under said first key, said personal identification number received across said input line upon coupling thereto of said transponder by said first switching means, said encrypted personal identification number being transmitted across said link;
   (f) a deciphering means, selectively responsive to said first key in said first memory portion, for decrypting an interrogator identification number and a first random number, both of which have been encrypted under said first key at said remote system and transmitted to said transponder across said link, said decrypted first random number being stored in said third memory portion; and
   (g) control means for generating said first key upon receipt of said personal identification number through said first switching means, for comparing said decrypted interrogator identification number with said prestored interrogator identification number, for generating a working key when said decrypted interrogator identification number and said prestored interrogator identification number match, otherwise aborting the transaction, said working key being a function of said personal identification number, of said interrogator identification number and of said first random number, said working key being stored in said fourth memory portion, said enciphering and said deciphering means being thereafter responsive to said working key and not to said first key, and for transmitting said interrogator identification number and said first random number to said host computer, both being encrypted under said working key, for verification of said working key by said host computer, said host computer transmitting an indication of said verification across said link to said transponder;
   (h) wherein, upon reciept of said indication by said transponder, said control means activates said third switching means to couple said input line to said output line.

2. The encrypting transponder of claim 1 further comprising:
   message authentication means, selectively coupled to said output line by fourth switching means, for storing a message authentication code, said message authentication code being automatically transmitted to said system upon receipt at said given terminal of an interrogation code from said system, said fourth switching means being actuated by said control means.

3. The transponder of claim 2 wherein:
each of said memory portions is a portion of a dynamic random access memory.

4. The transponder of claim 3 wherein:
said message authentication means comprises a portion of said dynamic random access memory.

5. The transponder of claim 2 further comprising:
a fixed memory for storing a preselected data set, said first key being a subset of said data set, said control means generating said first key from said data set.

6. The transponder of claim 5 wherein:
said fixed memory is a fused link read-only memory.

7. The transponder of claim 2 wherein:
said message authentication means is selectively responsive to said enciphering means and wherein said message authentication code is a preselected subset of data input to the input line of said transponder, said subset being encrypted under said working key.

8. The transponder of claim 7 wherein said interrogation code is a predetermined function of said first random number (Rn).

9. The transponder of claim 8 wherein said interrogation code is a pseudorandom function of said first random number.

10. The transponder of claim 1 further comprising:
an integral modem coupled between said output line and said link.

11. The transponder of claim 1 further comprising:
an integral digital interface adapter coupled between said output line and said link.

12. A passive encrypting transponder for authenticating messages transmitted between a given computer terminal and a remote digital system, including a host computer, across a telecommunications link and for ensuring that only authorized users are given access to said system for transactions from said given computer terminal, said transponder comprising:
(a) an input line, including first switching means, for coupling said given terminal to said transponder;
(b) an output line, including second switching means, for coupling said transponder to said link;
(c) third switching means for selectively coupling said input line to said output line;
(d) a user identification means including:
(i) a first memory portion for storing a preselected data set; and
(ii) a dynamic memory for storing a first key which uniquely identifies said given terminal from other terminals connectable to said system, each of said authorized users being provided with a personal identification number which uniquely identifies that user from other authorized users, said first key being a subset of said data set, and for storing an interrogator identification number which uniquely identifies said system from other possible systems;
(e) an enciphering means, responsive to said first key, for encrypting, under said first key, said personal identification number received across said input line upon coupling thereto of said transponder by said first switching means and transmitting it across said link;
(f) a deciphering means, responsive to said first key, for decryptinng an interrogator identification number and a random number transmitted across said link from said system; and
(g) control means for generating said first key and a working key, said working key upon generation from said personal identification number, said interrogator identification number and said random number, being transmitted to and stored in said dynamic memory, said control means further being coupled to said first, second and third switching means for control thereof upon receipt of an indication that said working key is verified.

13. The encrypting transponder of claim 12 further comprising:
a message authentication means, selectively coupled to said output line by fourth switching means, for storing a message authentication code, said message authentication code being automatically transmitted to said system upon receipt of an interrogation code from said system, said fourth switching means being actuated by said control means.

14. The transponder of claim 13 wherein said memory for storing said message authentication code is a preselected subset of data input to the input line of said transponder, said subset being encrypted under said working key.

15. The transponder of claim 14 wherein said interrogation code is a preselected function of said first random number.

16. The transponder of claim 15 wherein said interrogation code is a pseudorandom function of said first random number.

* * * * *